(12) United States Patent
Dai

(10) Patent No.: US 9,152,878 B2
(45) Date of Patent: Oct. 6, 2015

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Xiaoyan Dai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 13/910,528

(22) Filed: Jun. 5, 2013

(65) Prior Publication Data

US 2013/0336582 A1    Dec. 19, 2013

(30) Foreign Application Priority Data

Jun. 14, 2012  (JP) ................................ 2012-135124

(51) Int. Cl.
*G06K 9/46* (2006.01)
*G06K 9/34* (2006.01)
*G06T 7/00* (2006.01)

(52) U.S. Cl.
CPC ............... *G06K 9/4652* (2013.01); *G06K 9/34* (2013.01); *G06T 7/0081* (2013.01); *G06T 2207/10024* (2013.01); *G06T 2207/20144* (2013.01)

(58) Field of Classification Search
None
See application file for complete search history.

(56) References Cited

U.S. PATENT DOCUMENTS

| 7,623,712 | B2 | 11/2009 | Dai et al. | |
|---|---|---|---|---|
| 7,831,107 | B2 | 11/2010 | Dai et al. | |
| 7,936,929 | B2 | 5/2011 | Dai et al. | |
| 8,254,693 | B2 | 8/2012 | Ishigami et al. | |
| 2005/0180649 | A1* | 8/2005 | Curry et al. | 382/243 |
| 2007/0174268 | A1* | 7/2007 | Posse et al. | 707/5 |
| 2011/0002018 | A1 | 1/2011 | Tsunematsu et al. | |
| 2011/0164814 | A1* | 7/2011 | Onai et al. | 382/164 |
| 2011/0216976 | A1* | 9/2011 | Rother et al. | 382/173 |
| 2011/0280453 | A1* | 11/2011 | Chen et al. | 382/113 |

OTHER PUBLICATIONS

Rother et al., "Grabcut—Interactive foreground extraction using iterated graph cuts," ACM Trans. Graph., vol. 23, No. 3, 2004, pp. 309-314.

* cited by examiner

*Primary Examiner* — Bernard Krasnic
*Assistant Examiner* — Pinalben Patel
(74) *Attorney, Agent, or Firm* — Fitzpatrick, Cella, Harper & Scinto

(57) ABSTRACT

There is provided with an image processing apparatus. A setting unit sets a parameter indicating a likelihood of being foreground or a likelihood of being background for each pixel of the input image. A selection unit selects a first cluster, wherein the first cluster has color information indicating a color similar to a color which is indicated by color information of any cluster out of the second group of clusters. An adjustment unit configured to adjust the parameter of each of pixels which belong to the selected first cluster. An estimation unit estimates a region corresponding to the foreground part using the parameters associated with respective pixels after adjustment of the parameters by the adjustment unit.

8 Claims, 13 Drawing Sheets

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, image processing method, and storage medium and, more particularly, to a technique for extracting an object region from an image including a background region and the object region.

2. Description of the Related Art

Conventionally, an object extraction technique (to be also referred to as a segmentation technique hereinafter) in an image has been studied, and is applied for the purpose of image composition, refocusing of an object, and the like in video editing processing. An object will also be referred to as a foreground hereinafter, and object extraction will also be referred to as foreground/background separation hereinafter.

As the object extraction technique, a background difference method and chromakey method are well known. In the background difference method, an image including only a background without any object is captured in advance, and an image including an object and the image including only the background and without the object are compared to calculate a difference, thereby extracting the object. The chromakey method is a standard method used in the movie industry field. In this method, a background region of a given color is set, and an object is extracted under the assumption that colors of the object do not include the background color.

However, the background difference method and chromakey method are used in only environments in which easy background control is allowed, and when an object includes a color part close to the background color, an object region is readily erroneously determined as a background region.

In recent years, as an object extraction method which does not require any specific background, a method of manually designating rough information including an object region in an image, and separating an object from an image having an arbitrary background has been proposed (ROTHER et al., Grabcut—Interactive foreground extraction using iterated graph cuts, ACM Trans. Graph., vol. 23, No. 3, 2004, pp. 309-314). The method described in ROTHER et al. (to be referred to as grabcut processing hereinafter) obtains a global maximum likelihood solution based on minimization of an energy function. Also, since manual designation is easy, this method receives a lot of attention in the segmentation study field.

However, when the grabcut processing method described in ROTHER et al. is used, a part of a background may be erroneously extracted as an object (i.e. foreground).

SUMMARY OF THE INVENTION

According to some aspects of the present invention, an object region can be extracted more precisely in grabcut processing.

According to one aspect of the present invention, an image processing apparatus comprises: a first acquisition unit configured to acquire an input image; a second acquisition unit configured to acquire information that designates a foreground candidate region including a foreground part in the input image; a classifying unit configured to classify each pixel in the foreground candidate region to a cluster out of a first group of clusters according to the color information of that pixel, and to further classify each pixel outside the foreground candidate region to a cluster out of a second group of clusters according to color information of that pixel; a setting unit configured to set a parameter indicating a likelihood of being foreground or a likelihood of being background for each pixel of the input image; a selection unit configured to select a first cluster, wherein the first cluster has color information indicating a color similar to a color which is indicated by color information of any cluster out of the second group of clusters; an adjustment unit configured to adjust the parameter of each of pixels which belong to the selected first cluster; and an estimation unit configured to estimate a region corresponding to the foreground part using the parameters associated with respective pixels after adjustment of the parameters by the adjustment unit.

According to another aspect of the present invention, an image processing apparatus comprises: a first acquisition unit configured to acquire an input image; a second acquisition unit configured to acquire information that designates a foreground candidate region including a foreground part in association with the input image; a classifying unit configured to classify each pixel in the foreground candidate region to a cluster out of a first group of clusters according to the color information of that pixel, and to further classify each pixel outside the foreground candidate region to a cluster out of a second group of clusters according to color information of that pixel; a selection unit configured to select a first cluster, wherein the first cluster has color information indicating a color similar to a color which is indicated by color information of any cluster out of the second group of clusters; an integrating unit configured to integrate the selected first cluster to a second cluster out of the second group of clusters so that pixels included in the selected first cluster are included in the second cluster, wherein the first cluster has color information indicating a color similar to a color which is indicated by color information of the second cluster; a setting unit configured to set a parameter indicating a likelihood of being foreground or a likelihood of being background for each pixel of the input image; and an estimation unit configured to estimate a region corresponding to the foreground part using the parameters associated with respective pixels.

According to still another aspect of the present invention, an image processing method comprises: acquiring an input image; acquiring information that designates a foreground candidate region including a foreground part in the input image; classifying each pixel in the foreground candidate region to a cluster out of a first group of clusters according to the color information of that pixel, and further classifying each pixel outside the foreground candidate region to a cluster out of a second group of clusters according to color information of that pixel; setting a parameter indicating a likelihood of being foreground or a likelihood of being background for each pixel of the input image; selecting a first cluster, wherein the first cluster has color information indicating a color similar to a color which is indicated by color information of any cluster out of the second group of clusters; adjusting the parameter of each of pixels which belong to the selected first cluster; and estimating a region corresponding to the foreground part using the parameters associated with respective pixels after the adjustment of the parameters.

According to yet another aspect of the present invention, an image processing method comprises: acquiring an input image; acquiring information that designates a foreground candidate region including a foreground part in association with the input image; classifying each pixel in the foreground candidate region to a cluster out of a first group of clusters according to the color information of that pixel, and further classifying each pixel outside the foreground candidate region to a cluster out of a second group of clusters according to color information of that pixel; selecting a first cluster, wherein the first cluster has color information indicating a color similar to a color which is indicated by color information of any cluster out of the second group of clusters; integrating the selected first cluster to a second cluster out of the second group of clusters so that pixels included in the selected first cluster are included in the second cluster, wherein the first cluster has color information indicating a color similar to a color which is indicated by color information of the second cluster; setting a parameter indicating a likelihood of being foreground or a likelihood of being background for each pixel of the input image; and estimating a region corresponding to the foreground part using the parameters associated with respective pixels.

According to still yet another aspect of the present invention, a non-transitory computer readable medium stores a program for causing a computer to execute a method comprising: acquiring an input image; acquiring information that designates a foreground candidate region including a foreground part in the input image; classifying each pixel in the foreground candidate region to a cluster out of a first group of clusters according to the color information of that pixel, and further classifying each pixel outside the foreground candidate region to a cluster out of a second group of clusters according to color information of that pixel; setting a parameter indicating a likelihood of being foreground or a likelihood of being background for each pixel of the input image; selecting a first cluster, wherein the first cluster has color information indicating a color similar to a color which is indicated by color information of any cluster out of the second group of clusters; adjusting the parameter of each of pixels which belong to the selected first cluster; and estimating a region corresponding to the foreground part using the parameters associated with respective pixels after the adjustment of the parameters.

According yet still another aspect of the present invention, a non-transitory computer readable medium stores a program for causing a computer to execute a method comprising: acquiring an input image; acquiring information that designates a foreground candidate region including a foreground part in association with the input image; classifying each pixel in the foreground candidate region to a cluster out of a first group of clusters according to the color information of that pixel, and further classifying each pixel outside the foreground candidate region to a cluster out of a second group of clusters according to color information of that pixel; selecting a first cluster, wherein the first cluster has color information indicating a color similar to a color which is indicated by color information of any cluster out of the second group of clusters; integrating the selected first cluster to a second cluster out of the second group of clusters so that pixels included in the selected first cluster are included in the second cluster, wherein the first cluster has color information indicating a color similar to a color which is indicated by color information of the second cluster; setting a parameter indicating a likelihood of being foreground or a likelihood of being background for each pixel of the input image; and estimating a region corresponding to the foreground part using the parameters associated with respective pixels.

Further features of the present invention will become apparent from the following description of exemplary embodiments (with reference to the attached drawings).

DESCRIPTION OF THE EMBODIMENTS

Embodiments of the present invention will be described in detail hereinafter with reference to the drawings. However, components described in the following embodiments are merely examples, and the technical scope of the present invention is fixed by the scope of the claims and is not limited by the following individual embodiments.

Figure 1:
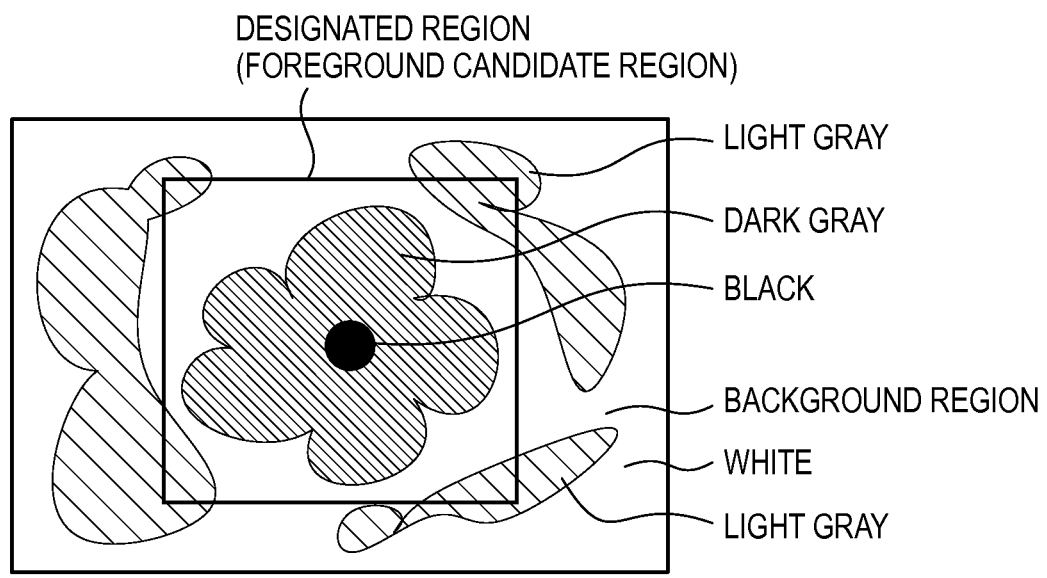
FIG. 1 is a view showing an example of an input image and a designation example of a foreground candidate region.

Grabcut processing is executed as follows. In step S1, a region including an object is designated. Normally, this region designation is made by the user, and a rectangular region including an object is designated. FIG. 1 shows an example of an input image, and shows a rectangular region designated by the user.

Note that a region, which is not designated by the user, is handled as a background. The region, which is not designated by the user, will be referred to as a fixed background region hereinafter. Pixels in the fixed background region are those which represent a background (background pixels), and will be referred to as fixed background pixels hereinafter. On the other hand, a region which is designated by the user normally includes both a foreground and background. The region which is designated by the user will be referred to as a foreground candidate region hereinafter, and pixels in the foreground candidate region will be referred to as foreground candidate pixels hereinafter. The following processing determines whether or not each pixel in the foreground candidate region is that which represents a foreground (foreground pixel) or a background (background pixel).

Next, in step S2, clustering processing is applied respectively to a group of pixels in the foreground candidate region and that in the fixed background region. Clustering is executed based on pixel values. That is, clustering is executed so that pixels having similar pixel values are included in the same cluster. This clustering is independently executed for the group of pixels in the foreground candidate region and that in the fixed background region. That is, pixels in the fixed background region are classified into several background clusters respectively having different color characteristics. Likewise, pixels in the foreground candidate region are classified into several foreground clusters respectively having different color characteristics.

Next, in step S3, parameters of an energy function associated with a graph are set. More specifically, an index N(m, n) which represents a similarity to a neighboring pixel n, an index $D_{Fore}(m)$ which represents a likelihood of being foreground, and an index $D_{Back}(m)$ which represents likelihood of being background are calculated for each pixel m.

The index N(m, n) is a parameter which represents the similarity of colors between pixels m and n, and assumes a larger value as colors are similar to each other. For example, the index N(m, n) can be calculated according to:

$$N(m, n) = \frac{\gamma}{dist(m, n)} e^{-\beta \|z_m - z_n\|^2} \beta = \frac{1}{2\langle \|z_m - z_n\|^2 \rangle} \quad (1)$$

where $\gamma$ is a value which is set in advance, dist(m, n) is a physical distance (a distance between pixels on an image) between the pixel m and neighboring pixel n, and $\|z_m - z_n\|$ is a color distance (a magnitude of a color difference) between the pixel m and neighboring pixel n. The index N(m, n) is calculated for all combinations of neighboring pixels m and n. Alternatively, the index N(m, n) may be calculated for all combinations of two pixels m and n or for those of pixels m and n which are close to each other. In consideration of this index N(m, n), a boundary between the foreground and background tends to be set between pixels whose colors are not similar to each other, compared to those whose colors are similar to each other.

The index $D_{Back}(m)$ is a parameter which represents a likelihood of being background. Likewise, the index $D_{Fore}(m)$ is a parameter which represents a likelihood of being foreground. The indices $D_{Back}(m)$ and $D_{Fore}(m)$ are calculated for respective pixels depending on the result of the clustering processing in step S2.

In step S1, each pixel is classified into a fixed background pixel or foreground candidate pixel. For the fixed background pixel, the index $D_{Back}(m)$ is L(m), and the index $D_{Fore}(m)$ is 0. Note that L(m) is an arbitrary value which is set in advance, and indicates a maximum value of the index D which represents the likelihood of being foreground or background. In addition to the processing in step S1, the user may specify some pixels as fixed foreground pixels in the same manner as the fixed background pixels. In this case, for the fixed foreground pixel, the index $D_{Back}(m)$ is 0, and the index $D_{Fore}(m)$ is L(m).

For each foreground candidate pixel m, the index $D_{Back}(m)$ is calculated according to:

$$D_{Back}(m) = -\log \sum_{i=1}^{K} \pi_i \frac{1}{\sqrt{\det \Sigma_i}} e^{\left(-\frac{1}{2}[z_m - \mu_i]^T \Sigma_i^{-1} [z_m - \mu_i]\right)} \quad (2a)$$

where $z_m$ is a color vector of the pixel m. $\mu_i$ is an average color vector of pixels which belong to a cluster i associated with the fixed background region. $\Sigma_i$ is an eigenvector of the cluster i. $\pi_i$ is a weighting coefficient for that pixel. K is a maximum value of a cluster number associated with the fixed background region, and normally indicates the number of clusters.

On the other hand, the index $D_{Fore}(m)$ for each foreground candidate pixel m is calculated according to:

$$D_{Fore}(m) = -\log \sum_{i=1}^{K} \pi_i \frac{1}{\sqrt{\det \Sigma_i}} e^{\left(-\frac{1}{2}[z_m - \mu_i]^T \Sigma_i^{-1} [z_m - \mu_i]\right)} \quad (2b)$$

where $z_m$ is a color vector of the pixel m. $\mu_i$ is an average color vector of pixels which belong to a cluster i associated with the foreground candidate region. $\Sigma_i$ is an eigenvector of the cluster i. $\pi_i$ is a weighting coefficient for that pixel. K is a maximum value of a cluster number associated with the foreground candidate region, and normally indicates the number of clusters.

In this manner, as the pixel value of the pixel m is closer to a color of a cluster associated with the fixed background region, the likelihood of being background of the pixel m becomes larger. On the other hand, as the pixel value of the pixel m is closer to a color of a cluster associated with the foreground candidate region, the likelihood of being foreground of the pixel m becomes larger.

Next, in step S4, a minimization problem of the energy function is solved using the parameters for the each pixel calculated in step S3, thus classifying a foreground candidate pixel into a foreground or background pixel, as described in ROTHER et al., Grabcut—Interactive foreground extraction using iterated graph cuts, ACM Trans. Graph., vol. 23, No. 3, 2004, pp. 309-314.

By repeating the processes of steps S2 to S4, binary data indicating whether respective pixels belong to a foreground or background is obtained. That is, in second or subsequent step S2, a pixel classified as a foreground pixel in immediately preceding step S4 is set as a new foreground candidate pixel, and clustering is executed for this foreground candidate pixel. Also, both of a pixel which is classified as a background pixel in immediately preceding step S4 and a pixel which has already been specified as a fixed background pixel are set as fixed background pixels, and clustering is executed for these fixed background pixels. Then, the parameters are calculated according to this clustering result in step S3, and a foreground candidate pixel is further classified into a foreground or background pixel according to these parameters in step S4.

Figure 2:
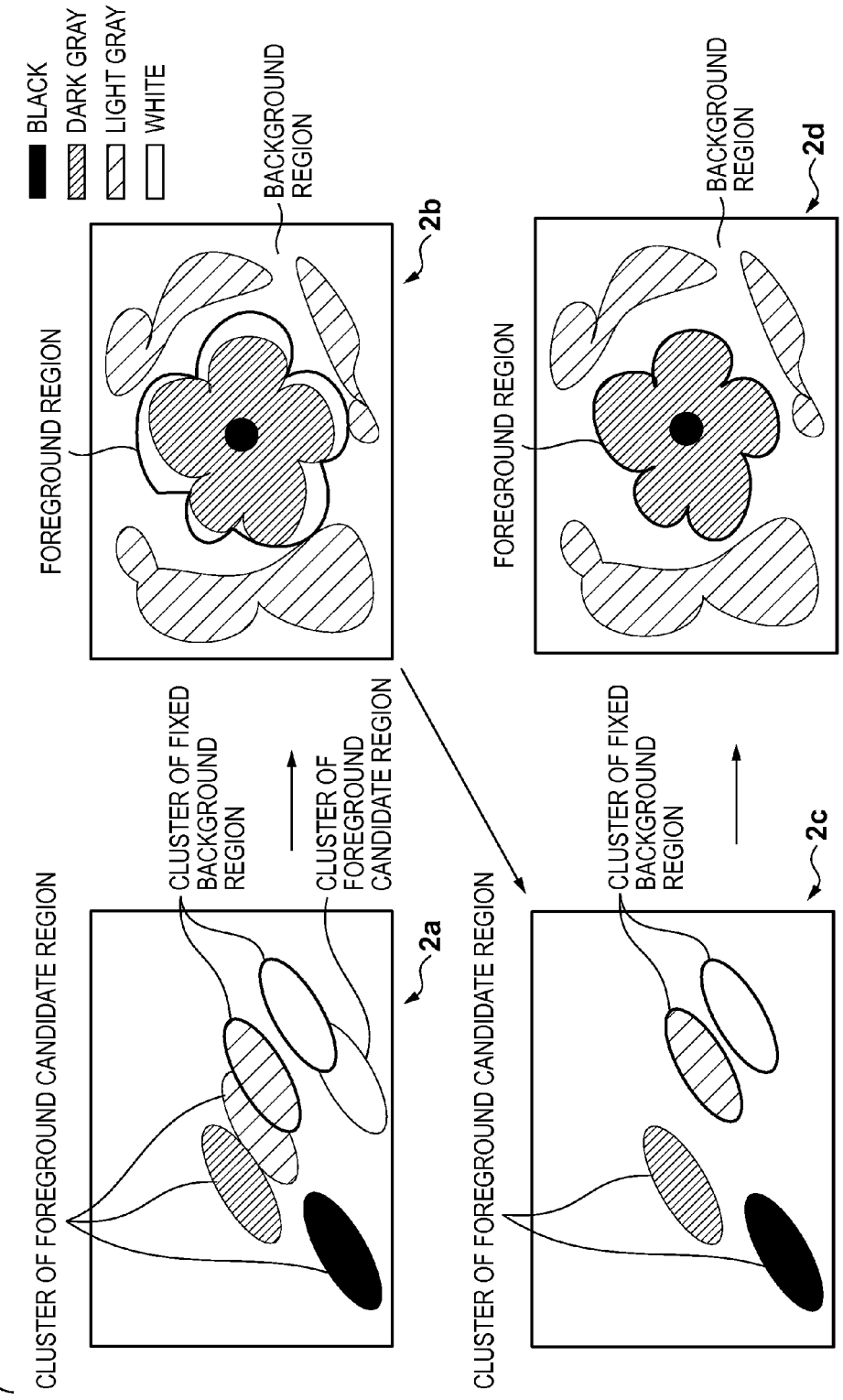
FIG. 2 is a view showing the grabcut processing result for the input image shown in FIG. 1.

The aforementioned grabcut processing will be described in more detail below while exemplifying the case in which the grabcut processing is applied to the input image shown in FIG. 1. FIG. 2 shows the intermediate result in the grabcut processing. The input image shown in FIG. 1 includes a black region, dark gray region, light gray region, and white region. As described above, the user designates the foreground candidate region in the input image, and this foreground candidate region includes a black region, dark gray region, light gray region, and white region. On the other hand, the fixed background region includes a light gray region and white region.

2a in FIG. 2 shows the clustering processing result in step S2 for the first time. 2a in FIG. 2 shows color distributions of clusters associated with the foreground candidate region and those associated with the fixed background region. The color distributions shown in 2a in FIG. 2 are obtained by projecting three-dimensional RGB color information onto a two-dimensional space in association with pixels included in respective clusters.

The foreground candidate region (that which is designated, as shown in FIG. 1) processed in step S2 for the first time includes a light gray region. Therefore, as shown in 2a in FIG. 2, clusters of the foreground candidate region include a light gray cluster, which overlaps a light gray cluster associated with the fixed background region. By solving the minimization problem of the energy function using this clustering result, a separation result shown in 2b in FIG. 2 is obtained.

2b in FIG. 2 shows a foreground region and background region after the first processing. In step S2 for the second time, the clustering processing is executed while handling the foreground region shown in 2b in FIG. 2 as a new foreground candidate region, and is also executed while handling the background region as a new fixed background region.

In this manner, the clustering processing and solution of the minimization problem of the energy function are repetitively executed. 2c in FIG. 2 shows the clustering result associated with the foreground candidate region and fixed background region in the n-th repetition processing. 2d in FIG. 2 shows the separation results of foreground and background regions after the n-th repetition processing. Since the foreground candidate region and fixed background region are updated every time, color information of each cluster of the respective regions is also updated. By repeating such processing, clusters of the foreground candidate region and those of the fixed background region, which partially overlap each other, are gradually separated, and the foreground/background separation results are consequently improved. In this manner, the clustering processing and the minimization processing of the energy function have synergistic effects.

Figure 3:
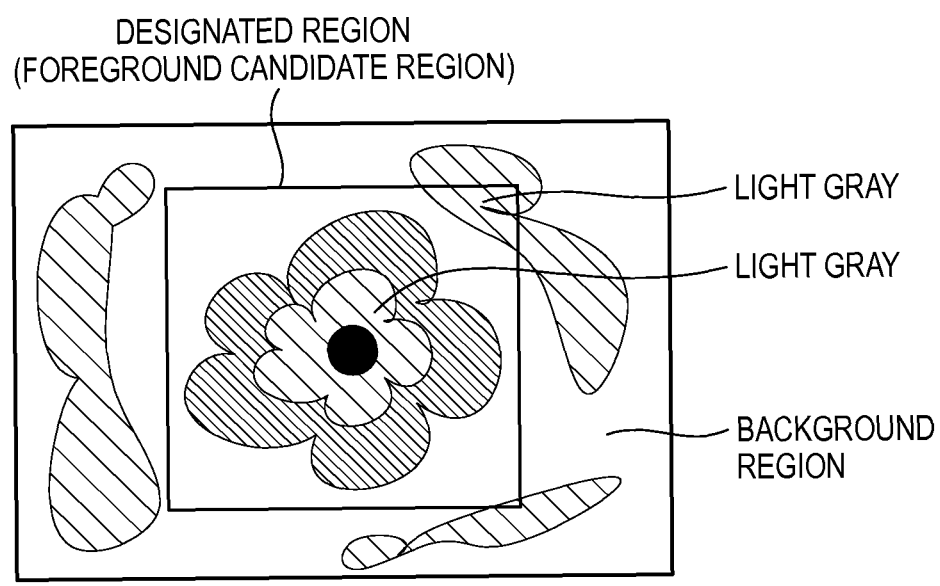
FIG. 3 is a view showing an example of an input image.
Figure 4:
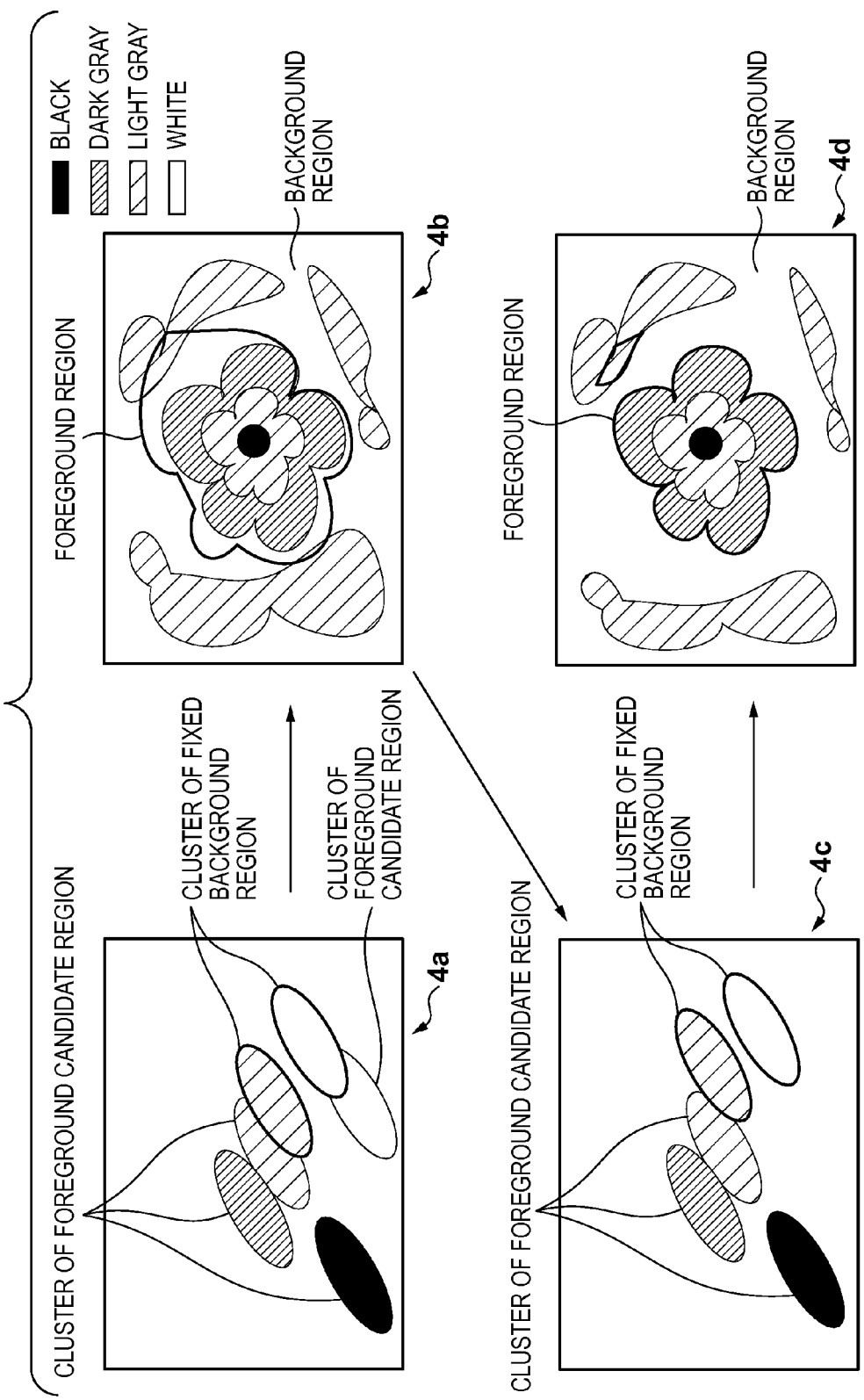
FIG. 4 is a view showing the grabcut processing result for the input image shown in FIG. 3.

However, the present inventor found that an object often fails to be extracted even by the grabcut processing. FIG. 3 shows an example of such case. FIG. 4 shows the processes of the grabcut processing for an image shown in FIG. 3. Similarly to FIG. 2, 4a in FIG. 4 shows distributions of clusters obtained by applying the clustering processing to a foreground candidate region and fixed background region, which are designated, as shown in FIG. 3. 4b in FIG. 4 shows separation results of foreground and background regions obtained by solving the minimization problem of the energy function according to the clustering result shown in 4a in FIG. 4. 4c in FIG. 4 shows the clustering result associated with a foreground candidate region and fixed background region in n-th repetition processing. 4d in FIG. 4 shows the separation results of foreground and background regions by the n-th repetition processing.

As can be seen from comparison between 4a and 4c in FIG. 4, since the foreground candidate region and fixed background region are updated, a cluster associated with the foreground candidate region and that associated with the fixed background region are slightly separated. However, since these clusters are not completely separated, a part of the background is erroneously extracted as an object, as shown in 4d in FIG. 4.

The present inventor found that when an object includes a region of the same color as that of the background, a part of the background is readily erroneously extracted as the object. For example, the object included in the image shown in FIG. 3 includes a light gray part, while the background also includes a light gray part. Since the foreground candidate region includes a color part close to the fixed background region, it is difficult to separate clusters of similar colors even by executing the clustering processing and minimization processing of the energy function. For this reason, a part of the background having a color similar to the foreground may often be erroneously extracted as the object.

Basically, in the grabcut processing, each of clustering for a foreground candidate region and fixed background region and solution of the minimization problem of the energy function are independently executed. However, by executing only the clustering processing for the foreground candidate region and fixed background region independently, a background part included in the foreground candidate region and an object part having a color similar to the background cannot be distinguished from each other. As a result, a part of the object may mix that of the background after separation.

First Embodiment

Arrangement of Image Processing Apparatus

Figure 5:
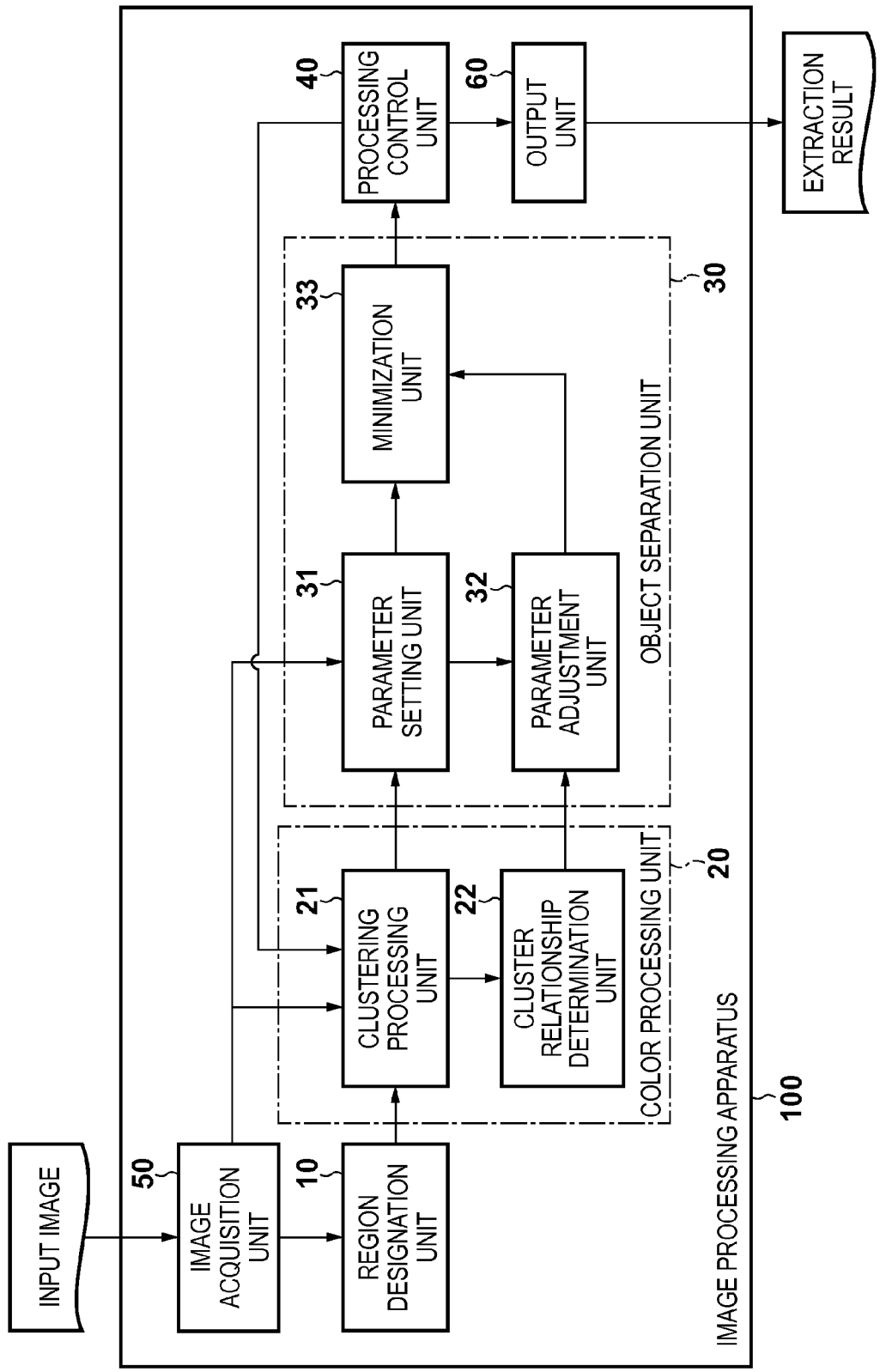
FIG. 5 is a block diagram showing the functional arrangement of an image processing apparatus according to the first embodiment.

FIG. 5 is a block diagram showing the functional arrangement of an image processing apparatus 100 according to the first embodiment of the present invention. The image processing apparatus 100 includes a region designation unit 10, color processing unit 20, object separation unit 30, processing control unit 40, image acquisition unit 50, and output unit 60.

The region designation unit 10 designates a foreground candidate region and fixed background region in an input image. As described above, pixels in the foreground candidate region are classified into foreground pixels or background pixels. Also, pixels in the fixed background region are classified into background pixels. The region designation unit 10 can externally receive information including this designation. For example, the region designation unit 10 can make this designation according to a user input. That is, the region designation unit 10 receives a user input that specifies a predetermined region in an input image, can classify the specified region as a foreground candidate region, and can classify a region which is not specified as a fixed background region. As a more practical example, the user can specify a rectangular region in an input image as a foreground candidate region. Normally, the user specifies a region including an object (foreground part) as a foreground candidate region. Also, the region designation unit 10 can also make this designation according to an instruction received from another processing unit included in the image processing apparatus 100.

The color processing unit 20 applies clustering processing respectively to the foreground candidate region and fixed background region. Note that the foreground candidate region and fixed background region indicate those designated by the region designation unit 10 or those decided by processing of the object separation unit 30. Details of this processing will be described later with reference to the flowchart shown in FIG. 7.

The color processing unit 20 includes a clustering processing unit 21 and cluster relationship determination unit 22. The clustering processing unit 21 clusters (classifies) each of the foreground candidate region and fixed background region based on color features. That is, respective pixels in the foreground candidate regions are classified to any of a group of a plurality clusters (group of first clusters), and respective pixels in the fixed background region (outside the foreground candidate region) are classified to any of a group of a plurality of clusters (group of second clusters). The cluster relationship determination unit 22 analyzes a color relationship between clusters classified by the clustering processing unit 21. More specifically, the cluster relationship determination unit 22 determines whether or not clusters associated with the foreground candidate region include a cluster similar to that associated with the fixed background region.

The object separation unit 30 separates the foreground candidate region into a foreground region and background region with reference to the processing result of the color processing unit 20. More specifically, the object separation unit includes a parameter setting unit 31, parameter adjustment unit 32, and minimization unit 33.

The parameter setting unit 31 calculates an index N indicating a similarity using equation (1) above for each pixel of an input image. Also, the parameter setting unit 31 calculates an index $D_{Fore}$ indicating a likelihood of being foreground and an index $D_{Back}$ indicating a likelihood of being background using equations (2a) and (2b) above and table 1 for each pixel of the input image. In this embodiment, these two indices are used as parameters which indicate a likelihood of being foreground or background. The processing of the parameter setting unit 31 is executed according to the clustering result by the clustering processing unit 21.

The parameter adjustment unit 32 adjusts the index $D_{Back}$ indicating the likelihood of being background based on a color similarity between clusters determined by the cluster relationship determination unit 22. More specifically, when one cluster associated with the foreground candidate region is similar to an arbitrary cluster associated with the fixed background region in terms of a color feature, the parameter adjustment unit 32 adjusts the index of pixels which belong to this cluster to indicate a higher likelihood of being background.

The minimization unit 33 separates the foreground candidate region into a foreground region and background region so as to minimize a value of the energy function decided by indices set by the parameter setting unit 31 and adjusted by the parameter adjustment unit 32.

The processing control unit 40 determines whether or not to repeat processing of the color processing unit 20 and object separation unit 30. The image acquisition unit 50 acquires input image data. The output unit 60 outputs information used to specify a region corresponding to an object part (foreground part). For example, the output unit 60 can output information indicating whether pixels are located in a foreground or background region, that is, an object extraction result according to the latest separation result of the minimization unit 33.

<System Arrangement>

Figure 6:
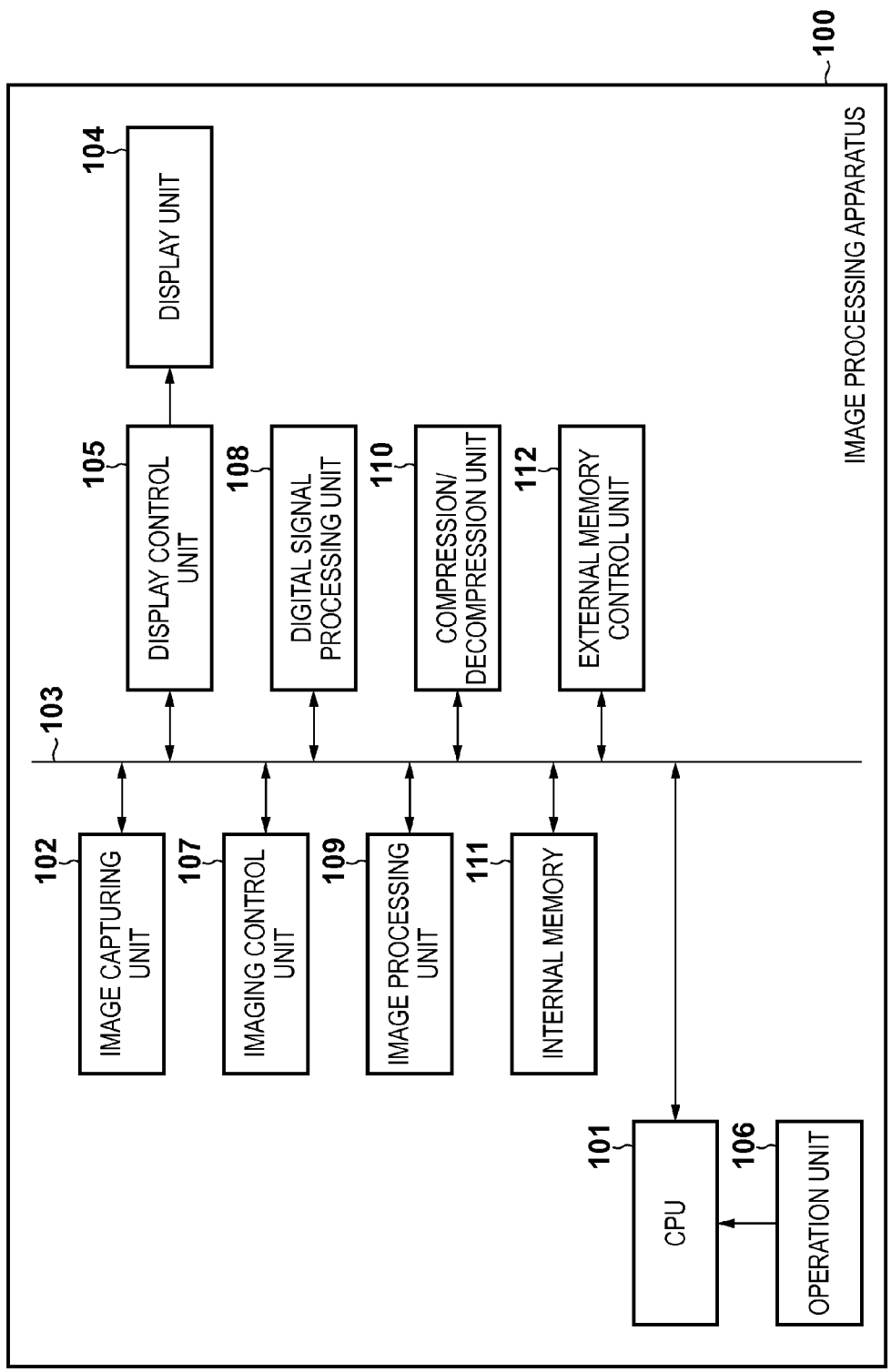
FIG. 6 is a block diagram showing the arrangement of principal part of the image processing apparatus according to the first embodiment.

FIG. 6 shows the arrangement of principal part of the image processing apparatus 100 according to this embodiment. The image processing apparatus according to this embodiment is an image capturing apparatus. Reference numeral 101 denotes a CPU (Central Processing Unit), which controls the following units. Reference numeral 102 denotes an image capturing unit, which acquires image data. Reference numeral 103 denotes a bus, which serves as a transfer path of various data. For example, image data acquired by the image capturing unit 102 is sent to a predetermined processing unit via this bus 103. Reference numeral 104 denotes a display unit which displays a captured image and characters. The display unit 104 can be, for example, a liquid crystal display. The display unit 104 may have a touch screen function. Reference numeral 105 denotes a display control unit, which controls display on the display unit 104. Reference numeral 106 denotes an operation unit which receives a user instruction. The operation unit 106 can include buttons or an imaging mode dial. The CPU 101 can control predetermined processing according to settings input via the operation unit 106. The aforementioned region designation unit 10 can acquire a region designation from a user via the display control unit 105 and operation unit 106.

Reference numeral 107 denotes an imaging control unit, which controls an image capturing system of the image capturing unit 102 based on an instruction from the CPU 101. Control operations of the image capturing system include a focusing operation, a shutter opening/closing operation, an aperture adjustment operation, and the like. Reference numeral 108 denotes a digital signal processing unit, which applies various kinds of image processing such as white balance processing, gamma processing, and noise reduction processing to image data received via the bus 103. Reference numeral 109 denotes an image processing unit, which applies image processing to image data output from the image capturing unit 102 or digital signal processing unit 108 in accordance with a user designation. Reference numeral 110 denotes a compression/decompression unit, which compresses image data. For example, the compression/decompression unit 110 can convert image data into a file format such as JPEG or MPEG, can convert image data into vector data, can execute encoding control, and so forth.

Reference numeral 111 denotes an internal memory which can function as a main memory, work area, or the like of the CPU 101. The internal memory 111 can store control programs and the like to be executed by the CPU 101. Reference numeral 112 denotes an external memory control unit, which serves as an interface required to connect the image processing apparatus 100 to a PC or media. The media include, for example, a hard disk, memory card, CF card, SD card, USB card, and the like.

The image acquisition unit 50 of the image processing apparatus 100 acquires, as input image data, image data captured by the image capturing unit 102 or that stored in the internal memory 111 or external memory. Then, the image processing apparatus 100 extracts an object from an input image under the control of the CPU 101. Furthermore, the output unit 60 of the image processing apparatus 100 outputs an object extraction result to the compression/decompression unit 110, internal memory 111, external memory, or a processing unit (not shown) which executes another image processing. In this case, the compression/decompression unit 110 can encode the object extraction result and can store or output the encoded result.

In the image processing apparatus 100 of this embodiment, which is the image capturing apparatus, functions of the respective units shown in FIG. 5 can be implemented when the CPU 101 operates according to computer programs recorded in the internal memory 111 or external memory. However, the image processing apparatus 100 is not limited to the image capturing apparatus, and can be implemented by a computer including a CPU which operates according to computer programs and a memory which records the computer programs. Also, in this embodiment, the functions of the respective units shown in FIG. 5 are implemented by the operations of the CPU 101, but the image processing apparatus 100 may have dedicated hardware which implements the functions of the respective units shown in FIG. 5.

<Sequence of Image Processing Method>

Figure 7:
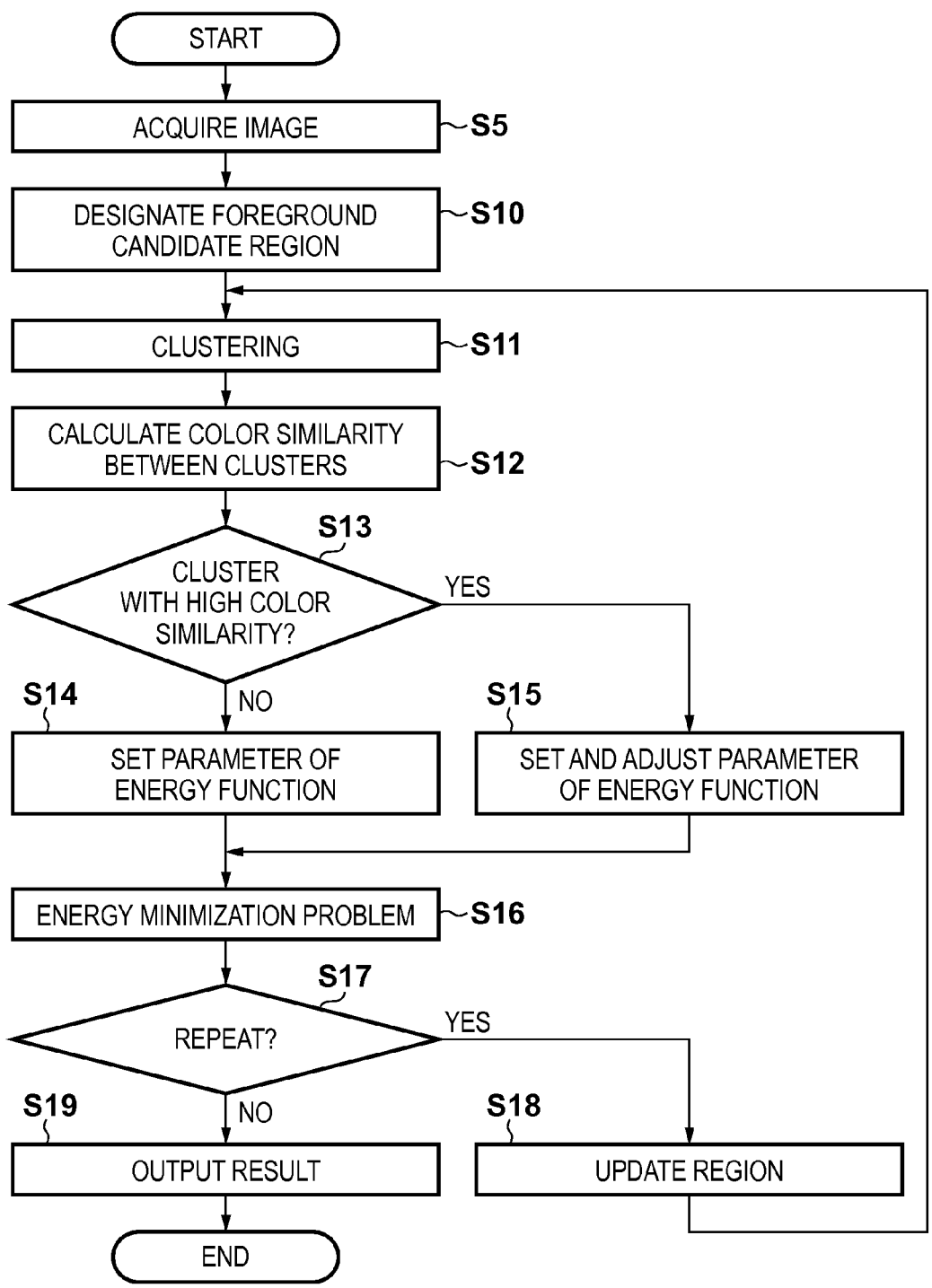
FIG. 7 is a flowchart showing an image processing method according to the first embodiment.

FIG. 7 is a flowchart showing processing according to this embodiment. In step S5, the image acquisition unit 50 acquires an input image. In step S10, the region designation unit 10 sets a foreground candidate region in the input image. As described above, the region designation unit 10 can make this region setting according to a user instruction acquired from the operation unit 106. A part which is not the foreground candidate region of the input image is handled as a fixed background region.

In step S11, the clustering processing unit 21 classifies pixels of each of the foreground candidate region and fixed background region into a plurality of clusters. As in step S2 above, the clustering is executed so that pixels having similar pixel values are included in an identical cluster. Also, the clustering is executed independently for the foreground candidate region and fixed background region. In this clustering processing, an estimation method of a Gaussian mixture distribution can be used. The clustering processing unit 21 records cluster numbers to which pixels belong in association with pixels of the foreground candidate region and fixed background region.

In step S12, the cluster relationship determination unit 22 calculates color similarities between clusters associated with the foreground candidate region and those associated with the fixed background region. In this embodiment, the cluster relationship determination unit 22 uses a color distance as a color similarity. The color distance may be a Euclidean distance of colors between clusters or other distances. As a color value of each cluster, a representative value of color values of pixels which belong to that cluster, for example, an average value, may be used. Details of the processing in step S12 will be described later with reference to FIG. 8.

The parameter setting unit 31 determines in step S13 whether or not clusters associated with the foreground candidate region include a cluster which has a color similar to that associated with the fixed background region. For example, if there is a cluster marked in step S129, the parameter setting unit 31 can determine that there is a cluster having a similar color. If there is no cluster having a similar color, the process advances to step S14. If there is a cluster having a similar color, the process advances to step S15.

In step S14, the parameter setting unit 31 calculates parameters of the energy function for each pixel. In this embodiment, the parameter setting unit 31 calculates the index N indicating a similarity, the index $D_{Fore}$ indicating a likelihood of being foreground, and the index $D_{Back}$ indicating a likelihood of being background, as described above.

In step S15, the parameter setting unit 31 and parameter adjustment unit 32 calculate parameters of the energy function for each pixel. In this embodiment, the parameter setting unit 31 and parameter adjustment unit 32 calculate the index N indicating a similarity, the index $D_{Fore}$ indicating a likelihood of being foreground, and the index $D_{Back}$ indicating a likelihood of being background. The cluster associated with the foreground candidate region, which cluster has a color similar to that associated with the fixed background region, is relatively more likely to be a part of a background region. Hence, in this embodiment, the parameter adjustment unit 32 increases the likelihood of being background of pixels which belong to the cluster associated with the foreground candidate region, which cluster has a color similar to that associated with the fixed background region. Details of the processing in step S15 will be described later with reference to FIG. 9.

In step S16, the minimization unit 33 classifies respective pixels of the foreground candidate region into those of a foreground region and those of a background region, so as to minimize a value of the energy function calculated according to the parameters set in step S14 or S15. The minimization unit 33 solves the minimization problem of the energy function to implement this processing. This minimization processing of the energy function can use a solution of a network flow problem in a known graph theory.

The processing control unit 40 determines in step S17 whether or not a flow volume of the energy function is reduced and whether or not a repetition count reaches a predetermined count. The processing control unit 40 then determines according to the determination result whether or not to end the repetition processing. For example, when the processing has been repeated the predetermined number of times, the processing control unit 40 can end the repetition processing. Also, when the value of the energy function calculated by the minimization unit 33 is determined to be converged, the processing control unit 40 can end the repetition processing. For example, when a difference between the latest value of the energy function calculated by the minimization unit 33 and that of the energy function calculated by the minimization unit 33 in the immediately preceding repetition processing is not more than a predetermined value, the processing control unit 40 can judge that the value of the energy function is converged. When one of these conditions is satisfied, the processing control unit 40 may end the repetition processing, or when both the conditions are satisfied, it may end the repetition processing. When the repetition processing is to end, the process advances to step S19. When the repetition processing is not to end, the process advances to step S18.

In step S18, the processing control unit 40 designates the foreground region decided in step S16 as a new foreground candidate region. Also, the processing control unit 40 adds the background region decided in step S16 to the fixed background region. After that, the process returns to step S11. In step S19, the output unit 60 outputs the object extraction result, as described above.

<Details of Calculation of Color Similarity>

Figure 8:
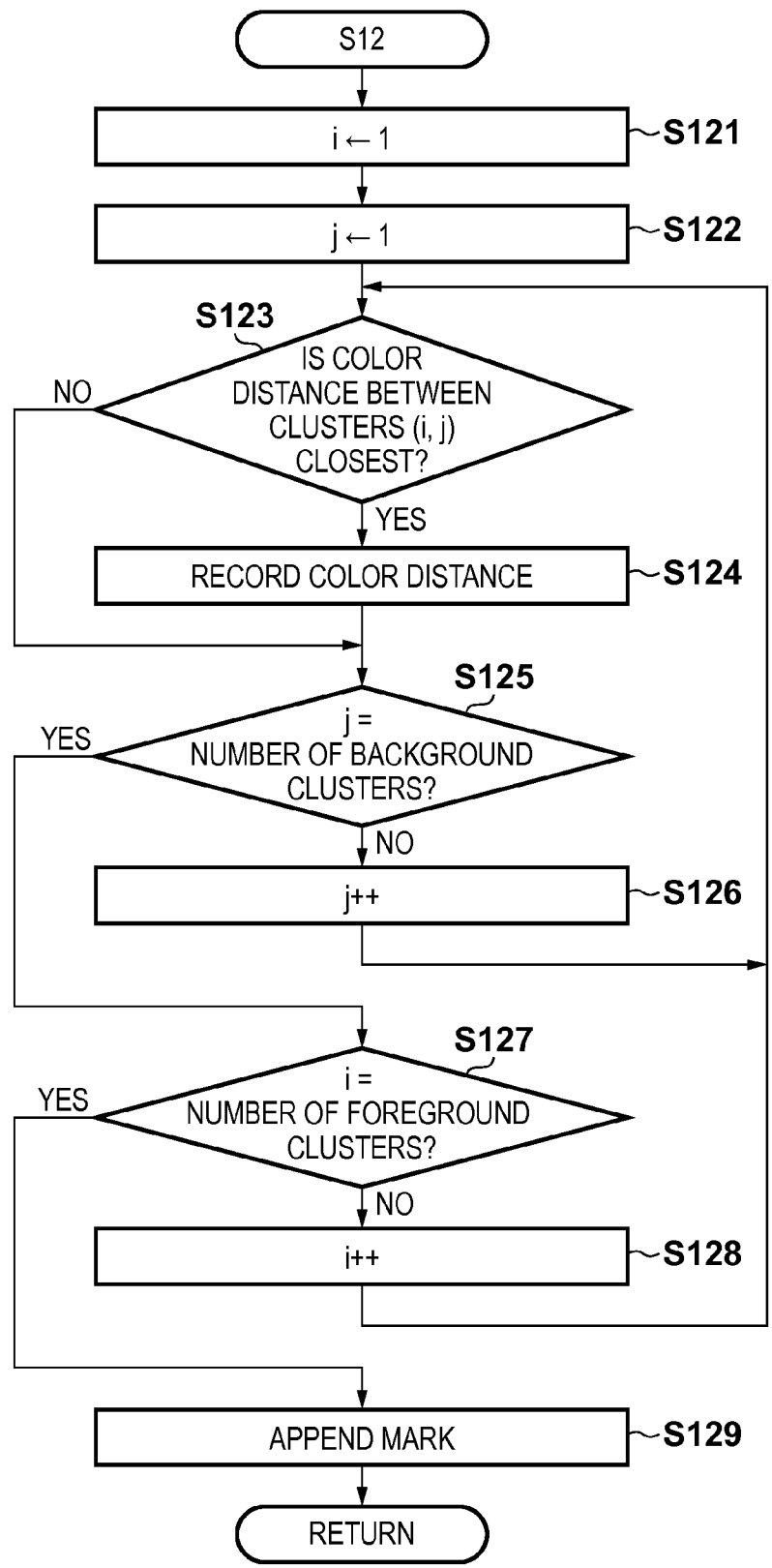
FIG. 8 is a detailed flowchart of step S12 according to the first embodiment.

Details of the calculation of color similarity in step S12 will be described below with reference to FIG. 8. In step S121, the cluster relationship determination unit 22 sets "1" in a variable i. The variable i indicates a cluster number of a cluster to be processed associated with the foreground candidate region. In step S122, the cluster relationship determination unit 22 sets "1" in a variable j. The variable j indicates a cluster number of a cluster to be processed associated with the fixed background region.

In step S123, the cluster relationship determination unit 22 calculates a color distance between an i-th cluster associated with the foreground candidate region and a j-th cluster associated with the fixed background region. Then, the cluster relationship determination unit 22 compares the calculated color distance with a variable M. This variable M indicates a minimum value of color distances calculated so far in step S123. The variable M is stored in the memory 111, and is initialized at the beginning of step S12. If the color distance calculated in step S123 is smaller than the variable M, the process advances to step S124. In this case, the color distance calculated in step S123 is smallest of those calculated so far. On the other hand, if the color distance calculated in step S123 is not less than the variable M, the process jumps to step S125.

In step S124, the cluster relationship determination unit 22 records the color distance calculated in step S123 as a new variable M. Also, the cluster relationship determination unit 22 records the current variables i and j as those corresponding to the variable M in the memory 111.

The cluster relationship determination unit 22 determines in step S125 whether or not the variable j matches the number of clusters associated with the fixed background region. If they do not match, the process advances to step S126. If they match, the process jumps to step S127. In step S126, the cluster relationship determination unit 22 increments the variable j by 1, and the process then returns to step S123.

The cluster relationship determination unit 22 determines in step S127 whether or not the variable matches the number of clusters associated with the foreground candidate region. If they do not match, the process advances to step S128. If they match, the process jumps to step S129. In step S128, the cluster relationship determination unit 22 increments the variable i by 1, and the process then returns to step S123.

In step S129, the cluster relationship determination unit 22 acquires the variable i corresponding to the variable M, which is recorded in the memory 111 in step S123. Then, the cluster relationship determination unit 22 appends a mark to the i-th cluster associated with the foreground candidate region.

More specifically, the cluster relationship determination unit 22 can record information indicating that the mark is appended to the i-th cluster in the memory 111. This i-th cluster is that associated with the foreground candidate region having the smallest color distance from arbitrary one of clusters associated with the fixed background region. In this way, the cluster relationship determination unit 22 selects a cluster having a color similar to that of a cluster associated with the fixed background region from the group of clusters associated with the foreground candidate region, and appends a mark to the selected cluster.

<Details of Processing of Setting and Adjustment of Parameter of Energy Function>

Figure 9:
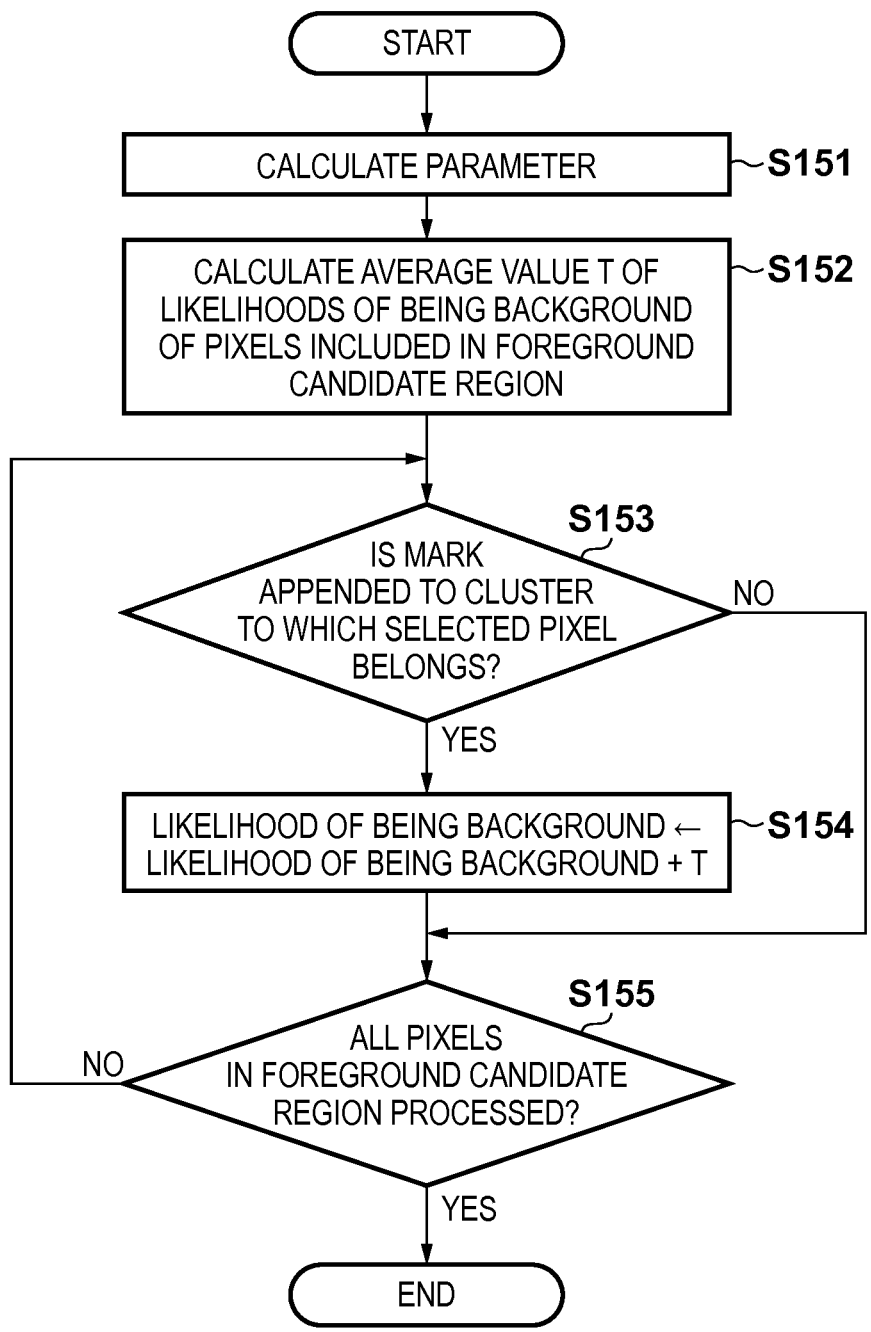
FIG. 9 is a detailed flowchart of step S15 according to the first embodiment.

The processing of the setting and adjustment of the parameter of the energy function in step S15 will be described below with reference to the flowchart shown in FIG. 9. In step S151, the parameter setting unit 31 calculates parameters of the energy function for each pixel as in step S14. In step S152, the parameter adjustment unit 32 calculates an average value T of the index $D_{Back}$ indicating likelihoods of being background of respective pixels of the foreground candidate region.

In steps S153 to S155, the parameter adjustment unit 32 adjusts the likelihood of being background of each pixel of the foreground candidate region. The detailed processing in steps S153 to S155 will be described below. In step S153, the parameter adjustment unit 32 selects one of pixels of the foreground candidate region. For example, the parameter adjustment unit 32 may select pixels in turn in a raster sequence. Then, the parameter adjustment unit 32 determines whether or not the cluster to which the selected pixel belongs is appended with a mark in step S129. If a mark is appended, the process advances to step S154. If no mark is appended, the process jumps to step S155.

In step S154, the parameter adjustment unit 32 adjusts the likelihood of being background of the pixel selected in step S153. More specifically, the parameter adjustment unit 32 adds the average value T of likelihoods of being background of respective pixels of the foreground candidate region calculated in step S152 to the index $D_{Back}$ indicating the likelihood of being background of the pixel selected in step S153.

The parameter adjustment unit 32 determines in step S155 whether or not all pixels of the foreground candidate region have been selected in step S153. If all the pixels of the foreground candidate region have not been selected yet, the process returns to step S153. If all the pixels of the foreground candidate region have been selected, the processing of step S15 ends.

<Processing Result Example>

Figure 10:
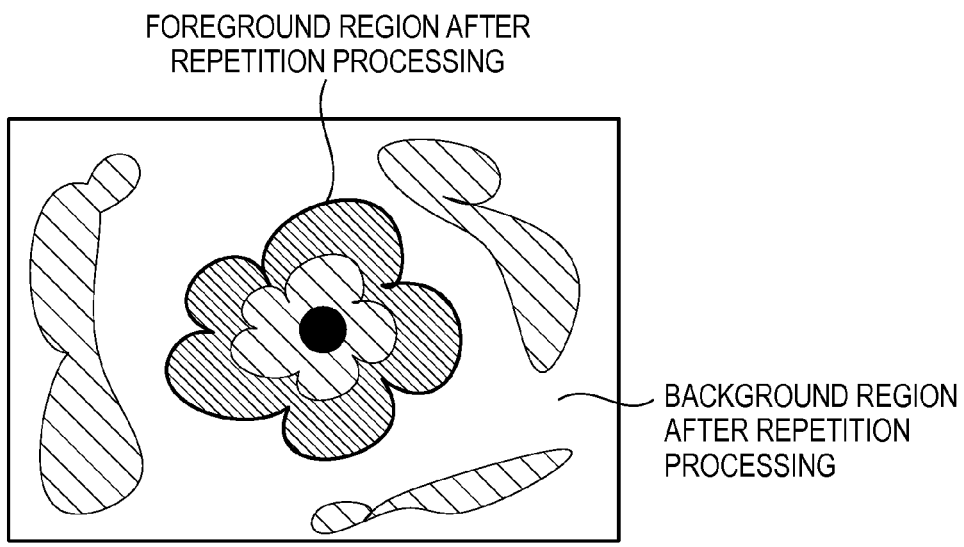
FIG. 10 is a view showing the grabcut processing result according to the first embodiment for the input image shown in FIG. 1.

FIG. 10 shows a processing result of the input image shown in FIG. 3 according to the first embodiment. In the conventional grabcut processing, the clustering processing is independently applied to the foreground candidate region and fixed background region. Then, the parameters of the energy function are set according to the clustering processing results, and the minimization problem of the energy function is solved. On the other hand, in the present embodiment, after the clustering processing is applied to each of the foreground candidate region and fixed background region, color relationships between clusters are detected. Then, the parameters of the energy function are set and adjusted according to the clustering results and the relationships between clusters, and the minimization problem of the energy function is solved using the adjusted parameters. As a result, even when a part of an object has a color close to a background, that object can be extracted more precisely.

In the conventional grabcut processing, the parameters associated with the likelihoods of being foreground and background for each pixel are decided by checking whether or not a color of that pixel is close to that of a cluster associated with the foreground candidate region and whether or not the color of that pixel is close to a cluster associated with the fixed background region. Therefore, the likelihoods of being foreground or background associated with pixels of a background part included in the foreground candidate region, and those associated with an object part having a color similar to that of the background part included in the foreground candidate region will have similar values. On the other hand, according to the processing of this embodiment, processing for increasing likelihoods of being background is executed for pixels which belong to a cluster associated with the foreground candidate region, which cluster has a color similar to that associated with the fixed background region. As a result, a possibility of erroneous detection of pixels of a background part included in the foreground candidate region as an object part can be reduced.

In the first embodiment, as described in association with step S154, in order to adjust the likelihood of being background, the average value T of likelihood of being background is added to the index $D_{Back}$ associated with a pixel to be adjusted. However, the adjustment method of the likelihood of being background is not limited to this method, and the likelihood of being background of each pixel can be increased using other methods. For example, a predetermined value may be added to the index $D_{Back}$.

Furthermore, in place of adjustment of the likelihood of being background of each pixel, the likelihood of being foreground of that pixel may be adjusted. More specifically, in step S154, the index $D_{Fore}$ indicating the likelihood of being foreground of the selected pixel may be adjusted to indicate a lower likelihood of being foreground. For example, a predetermined value may be subtracted from the index $D_{Fore}$ associated with the pixel to be adjusted, thus attaining this adjustment. Furthermore, in step S154, both of processing for increasing the likelihood of being background of the selected pixel and that for decreasing the likelihood of being foreground of the selected pixel may be executed.

In step S12 of this embodiment, a mark is appended to a cluster associated with the foreground candidate region, which cluster has the smallest color distance from arbitrary one of clusters associated with the fixed background region. Then, the processing for adjusting the likelihoods of being background is executed for pixels which belong to the cluster appended with the mark. However, the decision method of a cluster to be appended with a mark is not limited to this method. For example, in this embodiment, a mark is appended to one of clusters associated with the foreground candidate region. However, in some cases, a mark may be appended to two or more clusters, or a mark may be appended to none of clusters. For example, a mark may be appended to a cluster associated with the foreground candidate region, which cluster has the smallest color distance from arbitrary one of clusters associated with the fixed background region, and the color distance of which is not more than a predetermined value. More specifically, in step S129, only when the variable M is smaller than the predetermined value, a mark may be appended to the i-th cluster.

Alternatively, a mark may be appended to a cluster associated with the foreground candidate region, a color distance from any one of clusters associated with the fixed background region of which is not more than a predetermined value. For example, the cluster relationship determination unit 22 may determine in step S123 whether a color distance between the i-th cluster associated with the foreground candidate region and the j-th cluster associated with the fixed background region is not more than a predetermined value. Then, when the color distance is not more than the predetermined value, a mark may be appended to the i-th cluster associated with the foreground candidate region.

Furthermore, in this embodiment, when representative values of color values of clusters are similar to each other, it is determined that colors of these clusters are similar to each other. However, when distributions of pixel values of pixels included in clusters overlap each other on a color space, it can be determined that colors of these clusters are similar to each other. That is, when distributions of pixel values of pixels included in a cluster associated with the foreground candidate region and that associated with the fixed background region overlap each other, the likelihoods of being background of pixels which belong to this cluster associated with the foreground candidate region may be adjusted. Furthermore, in place of determination of cluster similarities on a color feature space, cluster similarities may be determined on a feature space indicating whether or not clusters of the foreground candidate region and those of the fixed background region include clusters whose distributions overlap each other. In this manner, as the decision method of a cluster associated with the foreground candidate region, which cluster has a color similar to that associated with the fixed background region, various methods can be employed.

In the first embodiment, the index N indicating a similarity, the index $D_{Fore}$ indicating a likelihood of being foreground, and the index $D_{Back}$ indicating a likelihood of being background are calculated according to equations (1), (2a), and (2b). However, these parameters may be calculated according to another method. Furthermore, the first embodiment uses the method of solving the minimization problem of the energy function based on the parameters of the energy function so as to separate foreground and background regions. However, another foreground/background separation processing method which calculates information amounts of pixels based on cluster information, and uses the acquired information amounts of the pixels may be used.

Second Embodiment

In the first embodiment, a cluster, likelihoods of being background of which are to be adjusted, of a foreground candidate region is selected based on a color similarity between clusters. In the second embodiment, a cluster, likelihoods of being background of which are to be adjusted, of a foreground candidate region is selected in consideration of the number of pixels of that cluster.

Processing according to this embodiment is the same as that according to the first embodiment shown in FIG. 7, except for processes of steps S13 and S153. The processes of steps S13 and S153 according to this embodiment will be described below. Other processes are the same as those in the first embodiment and, therefore, a description thereof will not be repeated. The processing according to this embodiment can be executed using an image processing apparatus 100 shown in FIGS. 5 and 6 as in the first embodiment.

A parameter setting unit 31 determines in step S13 whether or not clusters associated with the foreground candidate region include a cluster having a color similar to that associated with a fixed background region. This determination can be made in the same manner as in the first embodiment. Note that a cluster associated with the foreground candidate region, which cluster has a color similar to that associated with the fixed background region, will be referred to as a cluster of interest hereinafter.

The parameter setting unit 31 further determines in step S13 whether or not the number of pixels which belong to the cluster of interest is not less than a predetermined number or not less than a predetermined percentage. In an embodiment including a plurality of clusters of interest, the parameter setting unit 31 need only determine whether or not the number of pixels which belong to at least one cluster of interest is not less than a predetermined value or predetermined percentage. As a practical example, the parameter setting unit 31 may determine whether or not a ratio of the number of pixels, which belong to the cluster of interest, with respect to the number of pixels of the foreground candidate region is not less than the predetermined number. As another example, the parameter setting unit 31 may determine whether or not a ratio of the number of pixels, which belong to the cluster of interest, to the number of pixels of an input image is not less than the predetermined value.

If the clusters associated with the foreground candidate region include a cluster having a color similar to that associated with the fixed background region, and the number of pixels which belong to the cluster of interest is not less than the predetermined number or predetermined ratio, the process advances to step S15; otherwise, the process advances to step S14.

In step S153, a parameter adjustment unit 32 selects one of pixels of the foreground candidate region as in the first embodiment, and determines whether or not a cluster to which the selected cluster belongs is appended with a mark in step S129. The parameter adjustment unit 32 further determines in step S153 whether or not the number of pixels which belong to the cluster to which the selected pixel belongs is the predetermined number or predetermined ratio. This determination can be made in the same manner as in step S13. If a mark is appended to the cluster to which the selected pixel belongs, and the number of pixels which belong to the cluster to which the selected pixel belongs is the predetermined number or predetermined ratio, the process advances to step S154; otherwise, the process jumps to step S155.

When a color of a cluster associated with the foreground candidate region is similar to that of a cluster associated with the fixed background region, and the number of pixels which belong to this cluster associated with the foreground candidate region is large, pixels which belong to this cluster associated with the foreground candidate region are more likely to be a part of a background region. Hence, in this embodiment, parameters of an energy function of pixels of such cluster associated with the foreground candidate region are adjusted to increase likelihoods of being background.

Third Embodiment

In the first and second embodiments, a cluster associated with a foreground candidate region, to which cluster pixels indicating a background are likely to belong, is specified, and parameters of an energy function are adjusted in association with the pixels which belong to this cluster. In the third embodiment, a cluster associated with the foreground candidate region is integrated to a cluster associated with a fixed background region, which cluster has a similar color. Then, the parameters of the energy function are set according to the clustering result after integration.

Figure 12:
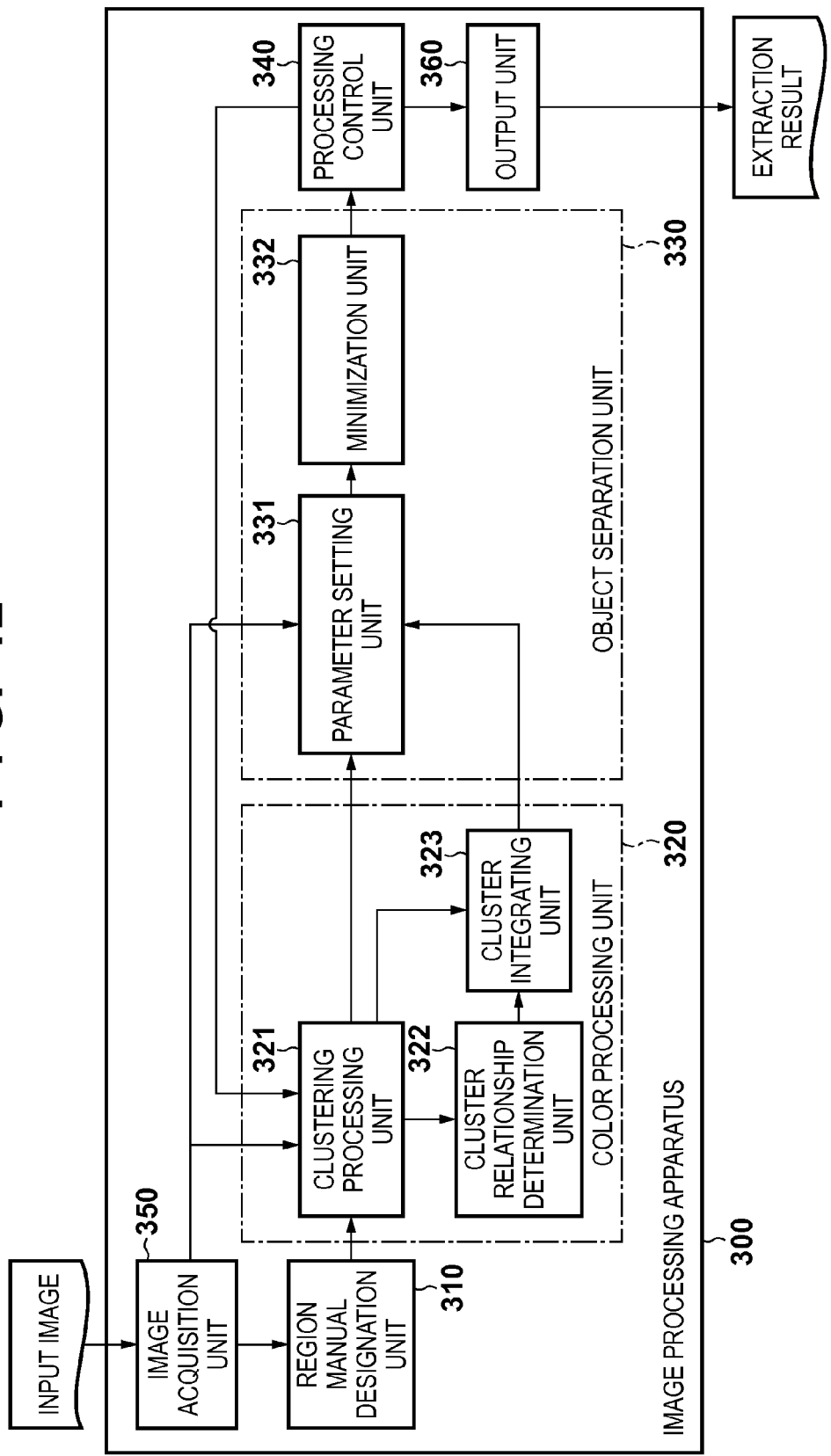
FIG. 12 is a block diagram showing the functional arrangement of an image processing apparatus according to the third embodiment.

FIG. 12 is a block diagram showing the functional arrangement of an image processing apparatus 300 according to the third embodiment. Functions of the image processing apparatus 300 can be implemented using an apparatus shown in FIG. 6. The image processing apparatus 300 includes a region designation unit 310, color processing unit 320, object separation unit 330, processing control unit 340, image acquisition unit 350, and output unit 360. Operations of the region designation unit 310, processing control unit 340, image acquisition unit 350, and output unit 360 are the same as those of the region designation unit 10, processing control unit 40, image acquisition unit 50, and output unit 60 according to the first embodiment, and a detailed description thereof will not be repeated.

The color processing unit 320 includes a clustering processing unit 321, cluster relationship determination unit 322, and cluster integrating unit 323. Operations of the clustering processing unit 321 and cluster relationship determination unit 322 are the same as those of the clustering processing unit 21 and cluster relationship determination unit 22 according to the first embodiment, and a detailed description thereof will not be repeated. The cluster integrating unit 323 integrates a pair of a cluster associated with the foreground candidate region and that associated with the fixed background region, which clusters have similar colors, and are selected by the cluster relationship determination unit 322.

The object separation unit 330 includes a parameter setting unit 331 and minimization unit 332. Operations of these units are the same as the parameter setting unit 31 and minimization unit 33 according to the first embodiment, and a detailed description thereof will not be repeated.

Figure 13:
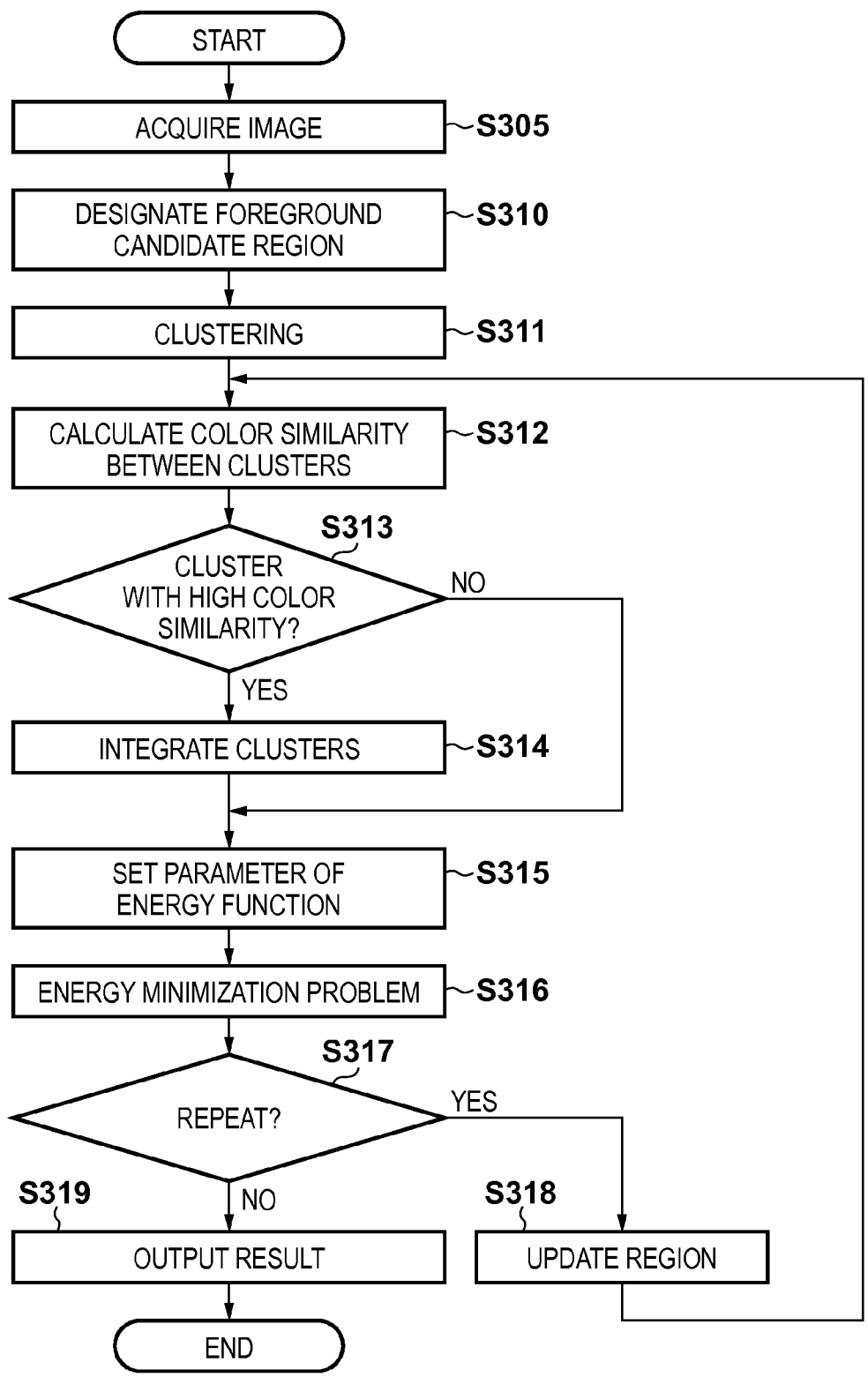
FIG. 13 is a flowchart showing an image processing method according to the third embodiment.

FIG. 13 is a flowchart of processing according to the third embodiment. Operations of steps S305 to S312 are the same as those of steps S5 to S12 according to the first embodiment, and a detailed description thereof will not be repeated. The parameter setting unit 331 determines in step S313 whether or not clusters associated with the foreground candidate region include a cluster having a color similar to that associated with the fixed background region in the same manner as in the first embodiment. If a cluster having a similar color is not found, the process jumps to step S315. If a cluster having a similar color is found, the process advances to step S314. In step S314, the cluster integrating unit 323 integrates the cluster associated with the foreground candidate region to the cluster associated with the fixed background region. The processing of step S314 will be described in detail later.

The processing of step S315 is the same as step S14 in the first embodiment, except that the parameter setting unit 331 sets parameters of the energy function using clustering results after the processing of step S314 when the processing of step S314 has been executed.

Processes of steps S316 to S319 are the same as those of steps S16 to S19 in the first embodiment, and a detailed description thereof will not be repeated.

<Processing of Cluster Integration>

Figure 14:
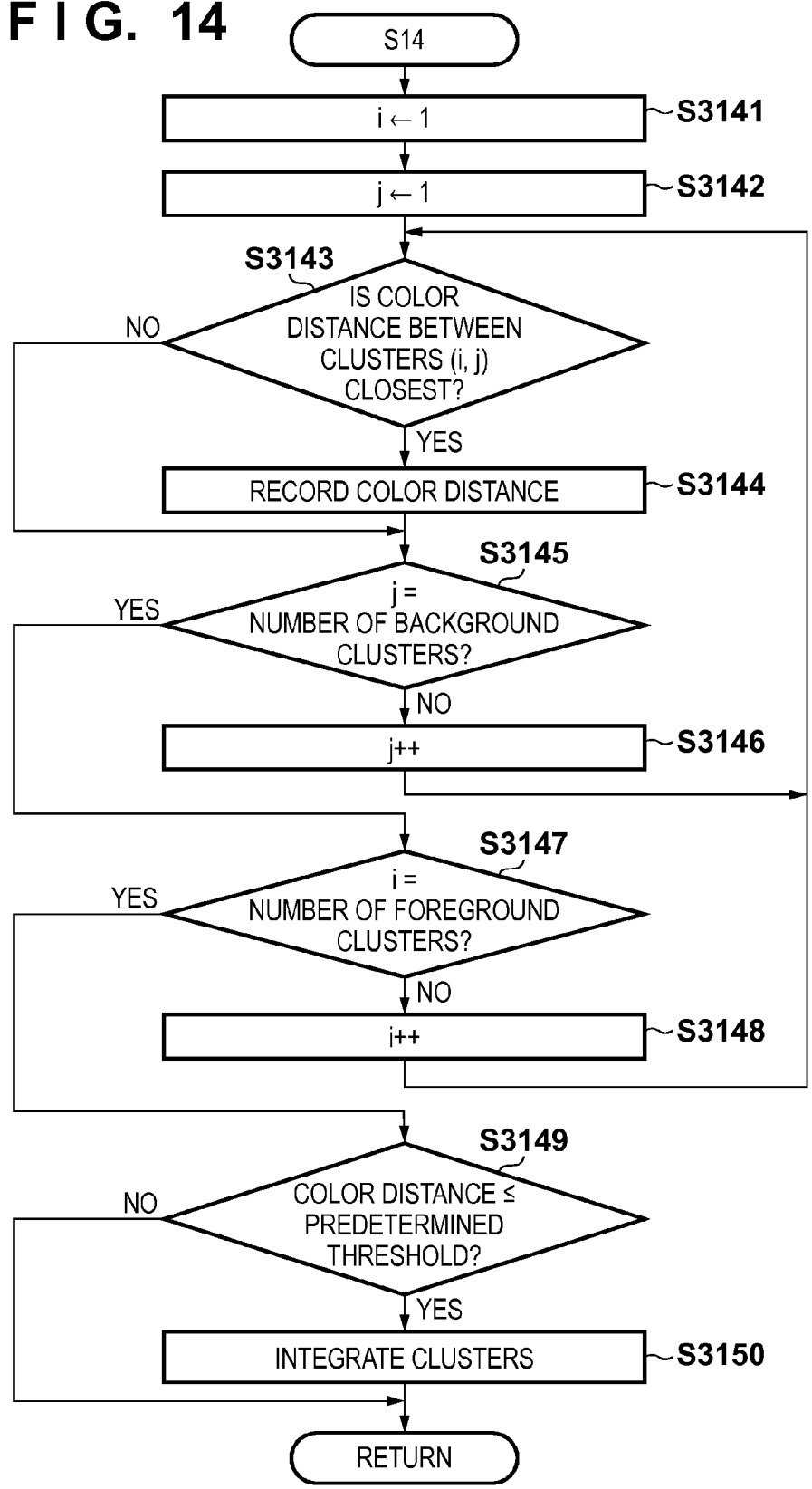
FIG. 14 is a detailed flowchart of step S314 according to the first embodiment.

The processing of the cluster integration will be described in detail below with reference to FIG. 14. Processes of steps S3141 to S3148 are the same as those of steps S121 to S128 in the first embodiment, and a detailed description thereof will not be repeated.

In step S3149, the cluster integrating unit 323 acquires a variable M recorded in a memory 111 in step S3143. Then, the cluster integrating unit 323 determines whether or not the variable M is not more than a threshold. If the variable M is not more than the threshold, the processing of step S314 ends. If the variable M is more than the threshold, the process advances to step S3150.

In step S3150, the cluster integrating unit 323 acquires variables i and j corresponding to the variable M, which are recorded in the memory 111 in step S3143. Then, the cluster integrating unit 323 integrates an i-th cluster associated with the foreground candidate region to a j-th cluster associated with the fixed background region. In this embodiment, the j-th cluster associated with the fixed background region after integration includes pixels which belong to the i-th cluster associated with the foreground candidate region before integration and those which belong to the j-th cluster associated with the fixed background region before integration. Then, the cluster integrating unit 323 updates color information of the j-th cluster associated with the fixed background region using that of the i-th cluster associated with the foreground candidate region. Also, the cluster integrating unit 323 deletes information of the i-th cluster associated with the foreground candidate region, and decrements the number of clusters associated with the foreground candidate region by 1.

In steps S3149 and S3150 of this embodiment, when a color distance between a color of the i-th cluster associated with the foreground candidate region and that of the j-th cluster associated with the fixed background region is not more than the threshold, these clusters are integrated. However, the i-th cluster associated with the foreground candidate region and the j-th cluster associated with the fixed background region may be integrated irrespective of their color distance. Such arrangement can be implemented when step S3150 is executed after step S3148 while skipping step S3149.

In this embodiment, a cluster associated with the foreground candidate region is integrated to a similar color cluster associated with the fixed background region. When likelihoods of being background of respective pixels are calculated according to the clustering results after integration, likelihoods of being background of integrated pixels, which belonged to the foreground candidate region, become higher than those without integration. As a result, as in the first embodiment, a possibility of erroneous detection of pixels of a background part included in the foreground candidate region as an object part can be reduced.

Fourth Embodiment

An application example of the object extraction processing described as the first to third embodiments will be described below. In the fourth embodiment, an input image is encoded according to an object extraction result.

Figure 11:
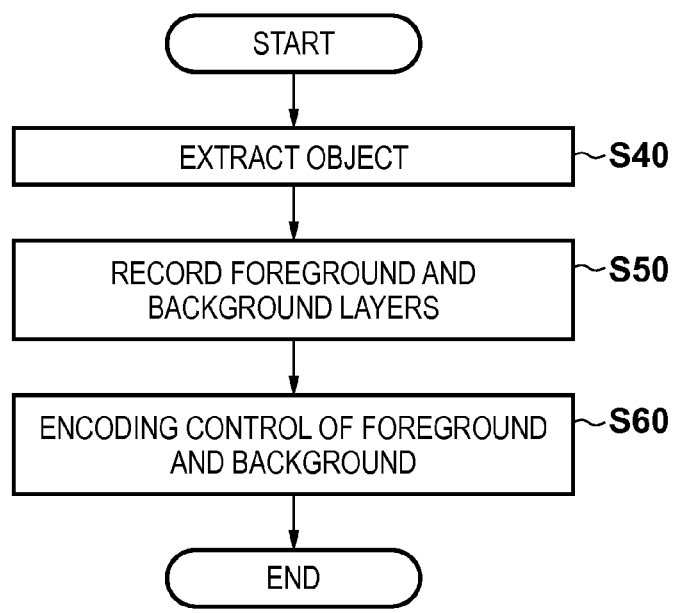
FIG. 11 is a flowchart showing an image processing method according to the fourth embodiment.

Processing of the fourth embodiment will be described below with reference to the flowchart shown in FIG. 11. The processing according to the fourth embodiment can be implemented using, for example, an image processing apparatus shown in FIG. 6. In step S40, a CPU 101 extracts an object from an input image according to any of the first to third embodiments described above. More specifically, in step S40, information indicating whether respective pixels included in the input image belong to a foreground region or background region is obtained.

In step S50, a compression/decompression unit 110 records a foreground and background as independent layers according to the extraction result in step S40. For example, the compression/decompression unit 110 can record color information of respective pixels which belong to a foreground region in a foreground layer, and can record color information of respective pixels which belong to a background region in a background layer.

In step S60, the compression/decompression unit 110 encodes the foreground layer and background layer, respectively. In this case, the compression/decompression unit 110 encodes the foreground and background layers at different compression ratios. As a practical example, the compression/decompression unit 110 compresses the foreground layer at a lower compression ratio (first processing), and compresses the background layer at a compression ratio higher than the foreground layer (second processing). In this case, the compression ratio of the whole image can be increased while maintaining higher image quality of the foreground region indicating an object.

In step S60 of this embodiment, the foreground and background layers are respectively encoded. However, the compression/decompression unit 110 may encode a binary mask image which indicates whether respective pixels included in the input image belong to the foreground region or background region. Alternatively, the compression/decompression unit 110 may record information indicating a boundary between the foreground region and background region, for example, position information of boundary pixels, which are located at the boundary between the foreground region and background region.

As another application example, refocus processing may be executed according to the object extraction result in the first to third embodiments. For example, blur processing may be applied to an image in the background region or to that in the foreground region. As still another application example, segmentation of a plurality of images acquired from a multi-eye image capturing apparatus, precision enhancement of a depth image, or the like may be implemented.

Other Embodiments

In the aforementioned embodiments, an object is extracted according to color information. However, an object can be extracted by the same method using depth information of each pixel. Such extraction can be implemented by executing clustering processing using depth information in place of color information, and calculating parameters of the energy function according to the depth information in place of the color information. Alternatively, an object may be extracted using both the color information and depth information.

In the aforementioned embodiments, an input image is separated into a foreground and background. Based on this separation result, alpha values, that is, transparency values of pixels, especially, those near a boundary between an object and background, may be calculated.

In the aforementioned embodiments, the processing for increasing likelihoods of being background is executed for pixels which belong to a cluster associated with the foreground candidate region, which cluster has a color similar to that associated with the fixed background region. As a result, a possibility of erroneous detection of pixels of a background part included in the foreground candidate region as an object part can be reduced. However, the method of the embodiments above is also applicable to a case in which pixels of an object part included in the foreground candidate region are erroneously detected as a background part. That is, processing for decreasing likelihoods of being background may be executed for pixels which belong to a cluster associated with the foreground candidate region, which cluster has a color similar to that associated with the fixed background region. In this case, a possibility of erroneous detection of pixels of an object part included in the foreground candidate region as a background part can be reduced. As described above, according to the embodiments above, by adjusting likelihoods of being foreground or background for pixels which belong to a cluster associated with the foreground candidate region, which cluster has a color similar to that associated with the fixed background region, an object part can be extracted from the foreground candidate region more precisely. Generally speaking, a satisfactory separation result tends to be obtained when processing for increasing likelihoods of being background is executed. However, the user can set whether likelihoods of being background are to be increased or decreased, and degrees of increasing or decreasing likelihoods of being background as needed while confirming the object extraction result.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-135124, filed Jun. 14, 2012, which is hereby incorporated by reference herein in its entirety.

What is claimed is:

1. An image processing apparatus comprising:
a processor functioning as:
a first acquisition processor configured to acquire an input image;
a second acquisition processor configured to acquire information that designates a foreground candidate region including a foreground part in the input image;
a classifying processor configured to classify each pixel in the foreground candidate region to a cluster out of a first group of clusters according to the color information of that pixel, and to further classify each pixel outside the foreground candidate region to a cluster out of a second group of clusters according to color information of that pixel;
a setting processor configured to set a parameter indicating a likelihood of being foreground or a likelihood of being background for each pixel of the input image;
a selection processor configured to select a first cluster, wherein the first cluster has color information indicating a color similar to a color which is indicated by color information of any cluster out of the second group of clusters;
an adjustment processor configured to adjust the parameter of each of pixels which belong to the selected first cluster when a ratio of the number of pixels which belong to the selected first cluster with respect to the number of pixels of the input image is not less than a predetermined ratio; and
an estimation processor configured to estimate a region corresponding to the foreground part using the parameters associated with respective pixels after adjustment of the parameters by said adjustment processor.

2. The apparatus according to claim 1, wherein said setting processor is further configured to set, for each pixel of the input image, the parameter indicating the likelihood of being foreground or the likelihood of being background so as to increase the likelihood of being foreground as a color indicated by that pixel is closer to a color indicated by color information associated with the first group of clusters and to increase the likelihood of being background as a color indicated by that pixel is closer to a color indicated by color information associated with the second group of clusters.

3. The apparatus according to claim 1, wherein said adjustment processor is further configured to adjust the parameter so as to increase the likelihood of being background.

4. The apparatus according to claim 1, wherein said adjustment processor is further configured to adjust the parameter so as to decrease the likelihood of being foreground.

5. The apparatus according to claim 1, wherein the processor further functions as a control processor configured to designate the region corresponding to the foreground part, which is estimated by said estimation unit, as a new foreground candidate region, and to control said classifying processor, said setting processor, said selection processor, said adjustment processor, and said estimation processor to execute repetition processing.

6. The apparatus according to claim 1, wherein said processor further functions as:
- a first processing processor configured to apply first processing to a region corresponding to the foreground part of the input image; and
- a second processing processor configured to apply second processing different from the first processing to a region which does not correspond to the foreground part.

7. An image processing method comprising:
- acquiring an input image;
- acquiring information that designates a foreground candidate region including a foreground part in the input image;
- classifying each pixel in the foreground candidate region to a cluster out of a first group of clusters according to the color information of that pixel, and further classifying each pixel outside the foreground candidate region to a cluster out of a second group of clusters according to color information of that pixel;
- setting a parameter indicating a likelihood of being foreground or a likelihood of being background for each pixel of the input image;
- selecting a first cluster, wherein the first cluster has color information indicating a color similar to a color which is indicated by color information of any cluster out of the second group of clusters;
- adjusting the parameter of each of pixels which belong to the selected first cluster when a ratio of the number of pixels which belong to the selected first cluster with respect to the number of pixels of the input image is not less than a predetermined ratio; and
- estimating a region corresponding to the foreground part using the parameters associated with respective pixels after the adjustment of the parameters.

8. A non-transitory computer readable medium storing a program for causing a computer to execute a method comprising:
- acquiring an input image;
- acquiring information that designates a foreground candidate region including a foreground part in the input image;
- classifying each pixel in the foreground candidate region to a cluster out of a first group of clusters according to the color information of that pixel, and further classifying each pixel outside the foreground candidate region to a cluster out of a second group of clusters according to color information of that pixel;
- setting a parameter indicating a likelihood of being foreground or a likelihood of being background for each pixel of the input image;
- selecting a first cluster, wherein the first cluster has color information indicating a color similar to a color which is indicated by color information of any cluster out of the second group of clusters;
- adjusting the parameter of each of pixels which belong to the selected first cluster when a ratio of the number of pixels which belong to the selected first cluster with respect to the number of pixels of the input image is not less than a predetermined ratio; and
- estimating a region corresponding to the foreground part using the parameters associated with respective pixels after the adjustment of the parameters.

* * * * *